United States Patent [19]

Hidawa et al.

[11] Patent Number: 5,306,460
[45] Date of Patent: Apr. 26, 1994

[54] METHOD OF PRODUCING CAST PRODUCTS USING ELASTIC MOLDS

[75] Inventors: Yoshiyuki Hidawa, Tokorozawa; Toshiya Fujishima, Zushi; Satoru Takeda, Akashi; Toshihiro Hayashi, Kobe; Hiroshige Kohno, Kawasaki, all of Japan

[73] Assignee: Asahi Denka Kogyo K.K., Tokyo, Japan

[21] Appl. No.: 960,221

[22] Filed: Oct. 13, 1992

Related U.S. Application Data

[62] Division of Ser. No. 690,390, Apr. 25, 1991, abandoned, which is a division of Ser. No. 494,371, Mar. 16, 1990, abandoned, which is a division of Ser. No. 340,092, Feb. 3, 1989, abandoned.

[30] Foreign Application Priority Data

Jun. 13, 1987 [JP] Japan ................... 62-147704

[51] Int. Cl.$^5$ .................... B29C 41/36; B29C 41/42
[52] U.S. Cl. ................... 264/500; 264/313; 264/314
[58] Field of Search .......... 264/500, 572, 309, 313, 264/314; 249/127; 425/253, 425, 439, 447, DIG. 44

[56] References Cited

U.S. PATENT DOCUMENTS

| | | | |
|---|---|---|---|
| 1,510,117 | 9/1924 | Von Vass | 425/425 |
| 3,222,725 | 12/1965 | Smith | 264/309 |
| 3,301,925 | 1/1967 | Engel | 425/425 |
| 3,778,213 | 12/1973 | Di Settembrini | 425/532 |
| 3,873,652 | 3/1975 | Ramacciotti | 264/270 |
| 4,101,617 | 7/1978 | Friederich | 264/572 |
| 4,315,037 | 2/1982 | Kelly | 264/313 |
| 4,414,164 | 11/1983 | Roba et al. | 264/309 |
| 4,802,839 | 2/1989 | Hidawa | 425/439 |
| 4,854,843 | 8/1989 | Takeda et al. | 425/437 |

FOREIGN PATENT DOCUMENTS

| | | | |
|---|---|---|---|
| 2106546 | 8/1972 | Fed. Rep. of Germany | 264/572 |
| 51-16384 | 4/1976 | Japan . | |
| 57-14968 | 3/1982 | Japan | 264/572 |
| 57-98788 | 6/1982 | Japan . | |
| 1031741 | 7/1983 | U.S.S.R. | 425/430 |

*Primary Examiner*—Catherine Timm
*Attorney, Agent, or Firm*—Armstrong, Westerman, Hattori, McLeland & Naughton

[57] ABSTRACT

A method of providing hollow cast products using a filling unit wherein a non-solid material is filled into elastic molds having open bag shaped interior filling sections by a filling nozzle insertable internally of the filling sections of the elastic molds and a blowing nozzle for blowing air into the filling section, which includes: partly filling the filling sections of the elastic molds with the non-solid material, and blowing air into the partly filled filling sections before the material solidifies to blow the material upward and solidify the material on the inner peripheral surface of the filling sections.

2 Claims, 6 Drawing Sheets

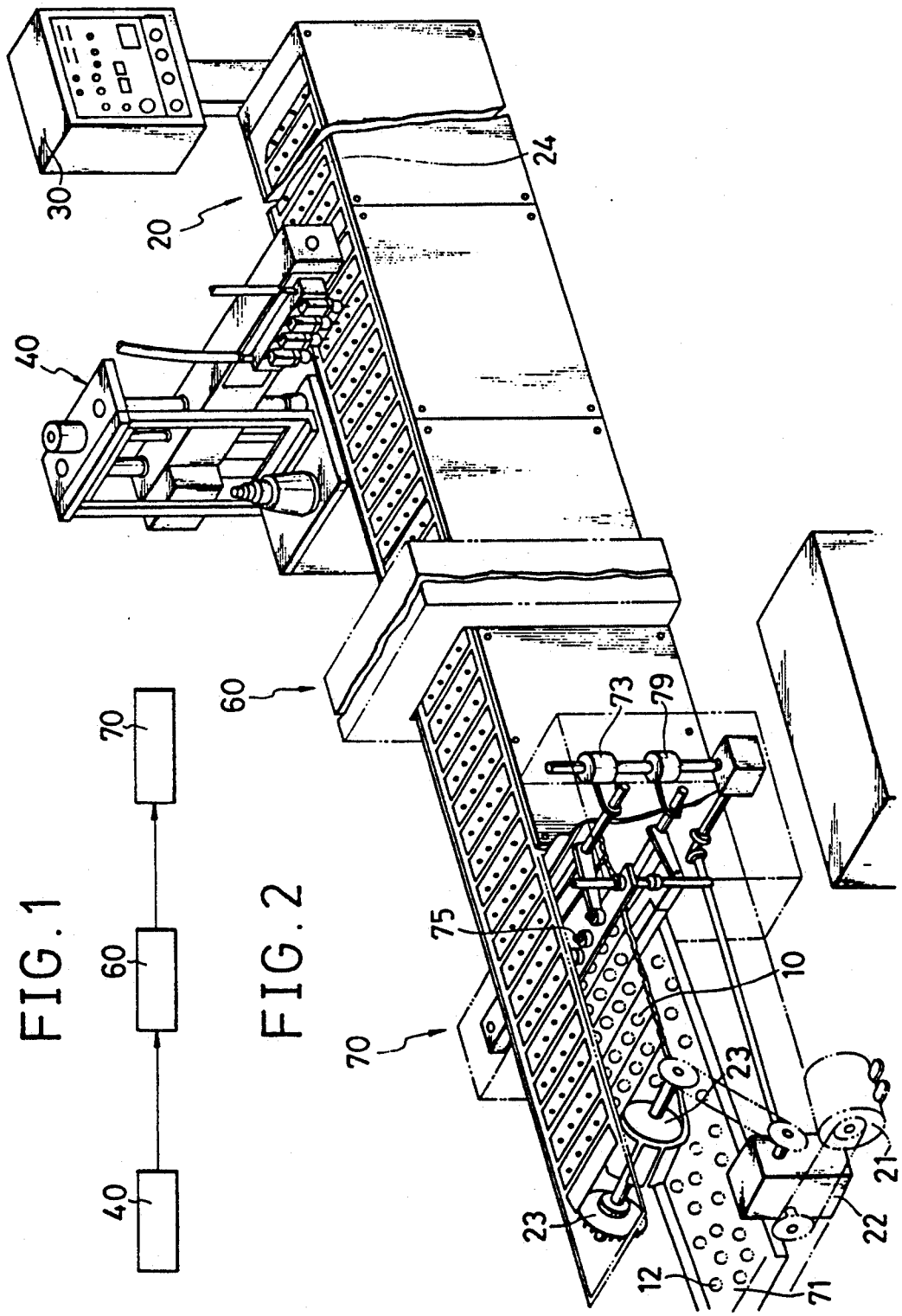

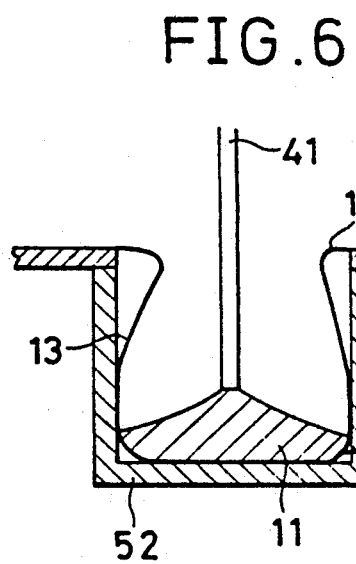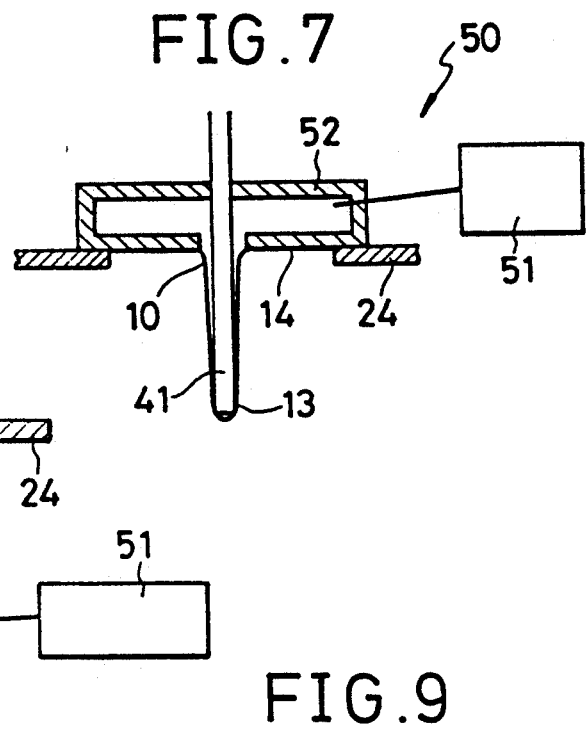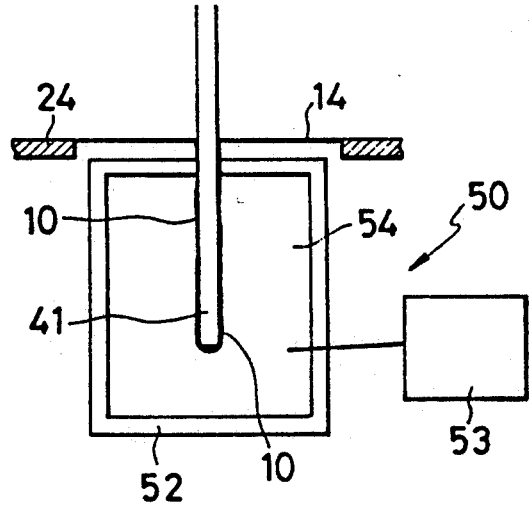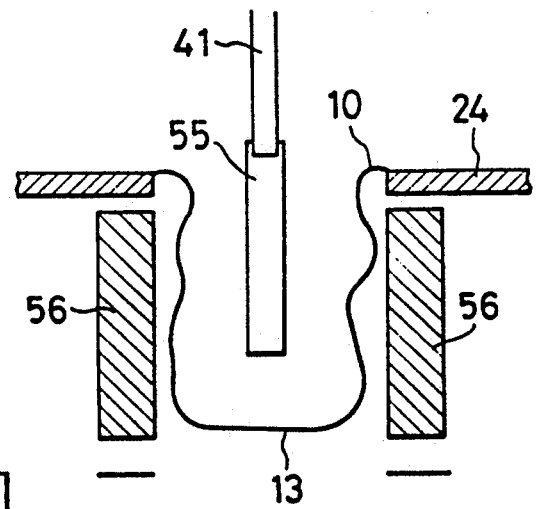

METHOD OF PRODUCING CAST PRODUCTS USING ELASTIC MOLDS

This is a division of application Ser. No. 690,390, filed on Apr. 25, 1991, abandoned which in turn is a division of application Ser. No. 494,371, filed Mar. 16, 1990, now abandoned, which in turn is a division of application Ser. No. 340,092, filed Feb. 3, 1989, now abandoned.

BACKGROUND OF THE INVENTION

1. Field of the Invention

The present invention relates to an apparatus for producing cast products and, more particularly, to an apparatus in which non-solid materials including water, paste-like chocolate, foodstuffs such as fish cake and fish paste, stationery such as rubber erasers, and daily necessities such as soap are filled in an elastic mold of open-bag shape, and are then solidified to yield cast products.

2. Description of Related Art

Conventionally, a variety of cast products including foodstuffs have been produced by using molds. Such conventional molds have been constructed of a plurality of split molds made of a rigid body in accordance with the configuration of cast products to be obtained using the molds.

According to these conventional methods, materials are first filled into the split molds, allowed to solidify inside the molds, and are then withdrawn by separating the split molds.

With such a conventional method using the split mold, the filling material is filled inside the split mold, and after the filled material is solidified inside the split mold, the filled material is withdrawn by dividing the split mold.

These split molds, however, tend to leave the mark of the joint of the mold on the surface of the product thus formed, resulting in lower product values. In addition, a large number of molds and complicated production steps are required especially when products of complicated shapes are desired to be formed.

Furthermore, since the split mold is made of a rigid body, the manufacture of the split mold itself is expensive and the product cost tends to be high. Especially when a variety of products are produced in small lots, the cost of the split mold occupies a greater part of the total cost of the product, and this almost prohibits the actual production of desired products.

In addition, if the split mold made of a rigid body is used, in the case of a filling material whose volume changes with temperatures when it solidifies, the split mold often breaks under a high pressure or a vacuum which may be applied to the mold during solidification.

Therefore, a measure has been devised to use as the mold an elastic mold having an open-bag shaped filling section so as to permit production of cast products which are free from joint marks, to reduce the production costs of the mold itself, prevent the mold from becoming damaged, and to substantially simplify the production process.

However, there are cases where it is desirable to produce cast products by using two or more kinds of material. In such a case, if, for instance, a plurality of different kinds of material are to be laminated in the height-wise direction of the cast product, it it possible to produce such a product by filling the filling material comprising different materials into the elastic mold via a filling nozzle in a plurality of cycles.

When the cast product is produced by using two or more kinds of material, there is a case where it is desirable to form the cast product into a double structure by dividing the materials into an inside portion an outer peripheral portion of the cast product.

Specifically, such cases include those in which whiskey is filled inside chocolate, or ordinary chocolate and white chocolate are formed into a double structure.

In such a case, it has been impossible to produce the cast product by merely filling the filling material into the elastic mold and solidifying the filled material.

Accordingly, an object of the present invention is to provide an apparatus for producing cast products which is capable allowing a filling material to be adhered to an inner peripheral surface of an elastic mold and to be solidified in that state, thereby producing hollow cast products and meeting the demand for diverse cast products.

SUMMARY OF THE INVENTION

To overcome the above-described problems, according to the present invention, there is provided an apparatus for producing cast products, comprising: a filling unit in which a non-solid material is filled from a filling nozzle into an elastic mold having an open-bag shaped filling section; a solidifying unit in which the filled material is solidified inside the elastic mold; and a withdrawal unit in which a solidified product is withdrawn from inside the elastic mold, wherein a suction nozzle for sucking the non-solid filling material in the elastic mold is provided at a position in which the filling material is not yet solidified by the solidifying unit.

In an apparatus for producing cast products in accordance with the present invention, a filling material is first filled into an elastic mold by a filling unit.

An elastic material is used for this elastic mold since it is necessary to withdraw the solidified filling material by causing the overall body of the elastic mold to expand or contract by the filling unit or the withdrawal unit.

Subsequently, the filling material in the elastic mold is allowed to solidify by the solidifying unit. A suction nozzle for sucking the filling material which is located inside and which has not been solidified is provided at a position where the filling material inside the elastic mold has not been completely solidified by the solidifying unit.

Namely, since the filling material inside the elastic mold solidifies due to the temperature of the atmosphere surrounding the elastic mold, the filling material begins to solidify starting with a portion thereof contacting an inner peripheral surface of the elastic mold which is susceptible to the effect of the ambient temperature.

Accordingly, in terms of the state of the filling material prior to complete solidification, the filling material in the vicinity of the inner peripheral surface of the elastic mold is solidified, but the inner part of the filling material remains non-solid.

Therefore, if the portion of the non-solid filling material is sucked by the suction nozzle, as described above, only the portion of the filling material which has solidified in the vicinity of the inner peripheral surface of the elastic mold remains in a hollow form.

In addition, if the filling material remaining in the vicinity of the inner peripheral surface of the elastic mold is made to further solidify, it is possible to obtain completely solidified hollow cast products.

A heating unit, a freezing unit or the like may be used as a solidifying unit depending on the properties of the filling material.

In addition, if a filling material of another type is filled inside the cast product solidified in the hollow form and is solidified by the solidifying unit, it is possible to obtain a double-structured cast product in the elastic mold.

Subsequently, the elastic mold is expanded in such a manner that the filled material which has solidified in the elastic mold is released from the mold, and the solidified cast product is removed by the withdrawal unit for withdrawing the solidified filled material.

With respect to the withdrawal unit, by evacuating the filling section of the elastic mold from the side thereof opposite to the opening, the elastic mold may be expanded to a size greater than that of the cast product, allowing the cast product to be withdrawn. In addition, the cast product can be withdrawn if the cast product is pushed from the side of the mold opposite to the opening.

Accordingly, cast products thus formed can be made hollow, and can be made into a double structure, as necessary.

BRIEF DESCRIPTION OF THE DRAWINGS

FIG. 1 is an overall block diagram;

FIG. 2 is a perspective view;

FIGS. 5 to 12 are schematic diagrams illustrating a filling unit;

DESCRIPTION OF THE PREFERRED EMBODIMENT(S)

Figure 4:
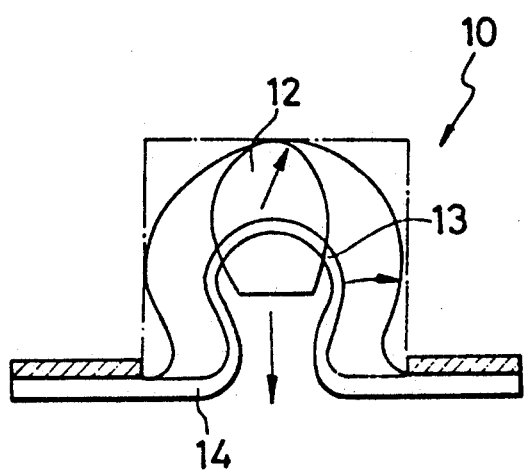
FIGS. 3 and 4 are schematic diagrams explaining the thickness of an elastic mold.

Referring now to the illustrated examples, an embodiment of an apparatus for producing cast products using a filling unit according to the present invention will be described.

FIG. 1 is a block diagram illustrating an overall configuration of the apparatus, and FIG. 2 is a partial perspective view.

As illustrated in the drawings, the present invention comprises a filling unit 40 in which a filling material 11 is filled into an elastic mold 10, a solidifying unit 60 in which the material 11 filled in the elastic mold 10 by the filling unit 40 is solidified, and a withdrawal unit 70 in which the filling material 11 solidified inside the elastic mold 10 is withdrawn. The units 40, 60, 70 are successively arranged along a transfer conveyor 20, and are controlled by means of a control unit 30.

The transfer conveyor 20 is driven by a pulley 23 connected to a motor 21 via a reducer 22 and intermittently travels between each unit at a velocity preset with the control unit 30. In addition, a multiplicity of fixing sheets 24 are fixed to the conveyor 20 in parallel with the direction of conveyor travel. Each fixing sheet 24 is provided with a fixing hole 25 which is larger than the size of the final cast product 12.

The elastic mold 10 comprises an open-bag shaped filling section 13 and a fixing member 14 formed near the opening of the filling section 13. The shape of the filling section 13 is spherical or cylindrical, or modeled after patterns of animals of specific characters. After the filling material 11 is solidified in the filling section 13, the filled material is adapted to assume the configuration of the sphere, cylinder, animal or character concerned.

The fixing member 14 is formed as a flange extending from the filling section 13 and fixed to each of a multiplicity of fixing sheets 24 secured to the transfer conveyor 20. The fixing member 14 is formed in such a manner as to allow the filling material 11 to be filled freely into the filling section 13.

In addition, it is desirable to set the thickness of the fixing member 14 slightly greater than that of the filling section 13 since only the filling section 13 needs to be expanded at the time of effecting expansion during a filling operation using the filling unit 40 or during a withdrawing operation using the withdrawal unit 70.

Figure 3:
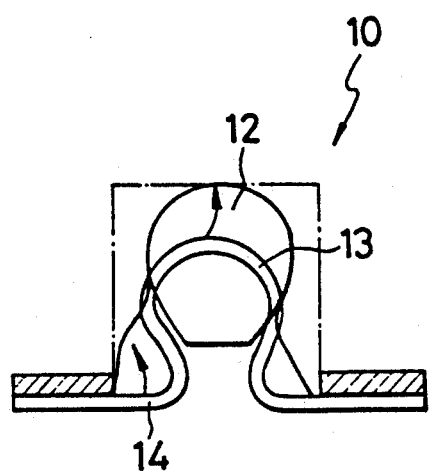

If the fixing member 14 and the filling section 13 are formed with an identical thickness, as shown in FIG. 3, mainly the fixing member 14 becomes elongated during expansion. Consequently, the cast product 12 remains in the filling section 1 3 which has not been elongated sufficiently, thereby making it impossible to effect a withdrawal operation of the cast product 12.

However, if the fixing member 14 is made thicker than the filling section 13, as shown in FIG. 4, mainly the filling section 13 becomes elongated, thereby facilitating the withdrawal of the cast product 12 contained in the filling section 13.

FIGS. 5 to 13 are diagrams individually explaining the filling, solidifying and withdrawing units.

FIGS. 5 to 9 illustrate an example of the filling unit 40.

When the filling material 11 is a low-viscosity material such as water, it suffices if the filling unit 40 is constituted by a filling mechanism 42 in which the filling nozzle 41 is placed above the opening of the elastic mold 10 and the filling material 11 is directly filled into the filling section 13 of the elastic mold 10 through the filling nozzle 41.

In this case, the filling nozzle 41 of the filling mechanism 42 is placed above the elastic mold 10, and after the filling nozzle 41 of the filling mechanism 42 has filled the material 11 into the elastic mold 10, the fixing sheet 24 is adapted to move successively under the filling nozzle 41 by the intermittent movement of the transfer conveyor 20 in order to continue the filling operation.

However, when the filling material 11 is of high viscosity, if the filling nozzle 41 of the filling mechanism 42 is located in the vicinity of the opening of the elastic mold 10 and the filling material 11 is filled directly from the filling nozzle 41 into the filling section 13 of the elastic mold 10, air is trapped inside the filling section 13 of the elastic mold 10, resulting in a solidified cast product 12 with cavities.

Figure 5:
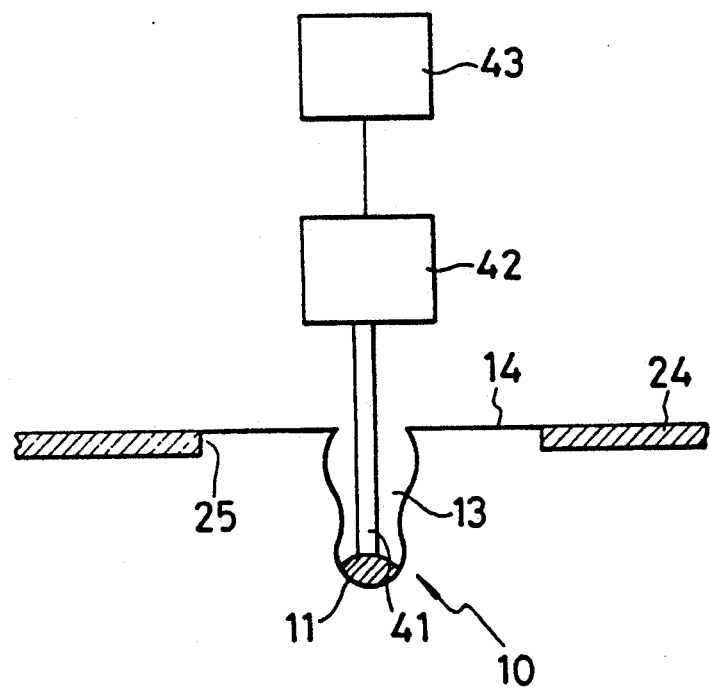

In such a case, as shown in FIG. 5, the filling unit 40 may be constituted by a filling mechanism 42 and a vertical motion mechanism 43 positioned above the filling mechanism 42. In this configuration, the filling nozzle 41 of the filling mechanism 42 is lowered to the vicinity of the bottom of the filling section 13 of the elastic mold 10 over the transfer conveyor 20 by means of the vertical motion mechanism 43. Filling is started at that position, and the vertical motion mechanism 43 is operated while the filling operation is being continued, and the filling nozzle 41 is raised gradually, depending on a rate of filling.

Therefore, in this configuration, there must be certain corresponding relationship between a filling velocity of the filling mechanism 42 and a vertically moving velocity of the vertical motion mechanism 43. In addition, each time the elastic mold 10 is used which has a different sectional configuration in the height-wise direction, the aforementioned filling velocity and a vertically moving velocity must be varied. For this reason, if the filling and vertically moving operations are performed by a cam or the like, the change of cams in conjunction with the change of elastic molds 10 is troublesome. Accordingly, it is desired that the two variables, a filling rate per unit time and the vertically moving velocity be controlled simultaneously by a programmable control system using the control unit 30.

Although in the foregoing description, a description has been given that the filling mechanism 42 moves vertically by the vertical motion mechanism 43, an arrangement may be alternatively provided in which, contrary to the aforementioned case, the filling mechanism 42 stays in its original position, while the elastic mold 10 is moved up and down by the vertical motion mechanism 43, since it suffices if the relative positions of the elastic mold 10 and the filling nozzle 41 are offset from each other during the filling operation.

When such units or components are assembled in a production line, it is possible to adopt an intermittently moving system such as one in which the elastic mold 10 is made to stay during a filling operation using the filling unit 40 and is then moved after completion of the filling operation. Alternatively, the filling unit 40 itself may be formed in such a manner as to be transferable along the production line to fill the filling material 11 from the filling unit 40 while the filling unit 40 is being moved.

However, when the viscosity of the filling material 11 is much higher, if the filling nozzle 41 is merely lifted in conjunction with the filling of the filling material 11, as described above, there are still cases where air bubbles are trapped inside the filling section 13.

In such a case, it is possible to devise various measures by taking note of the elasticity of the elastic mold 10.

For instance, as in the case of the embodiment of the present invention shown in FIG. 6, an arrangement may be provided such that the filling unit 40 is sucked under a vacuum from the side of the elastic mold 10 opposite to the filling nozzle 41, and filling is started after the elastic mold 10 is expanded.

More specifically, a vacuum mechanism 52 communicating with a vacuum source 51 is provided on the side of the elastic mold 10 opposite to the filling nozzle 41, the elastic mold 10 being located at the position of a predetermined fixing sheet 24.

Subsequently, prior to starting the filling of the filling material 11, the internal pressure of this vacuum mechanism 52 is decreased to expand the elastic mold 10.

The filling material 11 is filled into the elastic mold 10 in a state in which the elastic mold 10 has thus been expanded.

The amount of this filling material 11 filled is set to be identical with an appropriate amount to be filled when the size of the elastic filling mold 10 is normal.

Then, the filling material reaches only a part of the elastic mold 10 which is being expanded.

After a predetermined amount of the filling material 11 has been filled in the elastic filling mold 10, the vacuum source 51 is adjusted in such a manner that the internal pressure of the vacuum mechanism will return to the normal pressure.

Then, the size of the elastic mold 10 is consequently returned to the normal size, and since the filling material 11 is filled in the elastic mold 10 during the returning process, the trapping of air bubbles inside the elastic mold 10 is prevented as a result.

As another example in cases where such a filling unit 40 is used, it is possible to provide an arrangement in which the filling material 11 in an amount about half the necessary amount to be filled is filled temporarily with the elastic mold 10 expanded under a vacuum using the same means as described above, and after the size of the elastic mold 10 is returned to a normal size, the elastic mold 10 is expanded again, the filling material 11 in an amount equivalent to the remaining amount is then filled, and the elastic mold 10 is further returned to the normal size to complete the filling operation.

As the cast product is thus formed, it is possible to prevent air bubbles from becoming trapped in the elastic mold 10, and it is possible to effect molding by using the elastic mold 10 which is thus made more precise.

Furthermore, for example, it is possible to provide the following arrangement. The filling material 11 in an amount about half the necessary amount to be filled is temporarily filled by a primary filling unit with the elastic mold 10 expanded, and, after the elastic mold 10 is returned to its normal size, the elastic mold 10 is pressed from both sides by a pressing unit (not shown) to release the air contained therein. The elastic mold 10 is then expanded again and the filling material 11 in an amount equivalent to the remaining amount is filled by using a secondary filling unit, and the elastic mold 10 is then returned to its normal size, thus completing the filling operation. Incidentally, when such a filling unit 40 is used, it is desirable that the entire system move intermittently to allow the primary filling unit, the pressing unit, and the secondary filling unit to be operated consecutively.

In addition, as examples of the filling unit 40, as in the case of the embodiments shown in FIGS. 7 and 8, by taking note of the elasticity, which is a characteristic of the elastic mold 10, the filling section 13 is brought into close contact with the filling nozzle 41 in advance by means of a contact unit 50. If the filling of the filling material 11 is started beginning with that state, it is possible to prevent air bubbles from being trapped.

The embodiment shown in FIG. 7 is arranged such that the vacuum mechanism 52 connected to the vacuum source 51 is disposed above the fixing sheet 24, and, as this vacuum mechanism is operated, the filling section 13 is brought into close contact with the filling nozzle 41.

In addition, the embodiment shown in FIG. 8 is arranged such that a high-pressure mechanism 54 connected to a high-pressure source 53 is disposed below the fixing sheet 24, and, as this high-pressure mechanism is operated, the filling section 13 is brought into close contact with the filling nozzle 41.

Whichever means is used, when starting to fill the filling material from the filling nozzle 41 into the filling section 13, the state is such that the elastic filling section 13 is brought into close contact with the filling nozzle 41, i.e., no air exists between the filling nozzle 41 and the filling section 13. Therefore, if the filling of the filling material 11 is started with a high pressure above the pressure generated by the vacuum source 51 or the high-pressure source 53 by beginning with this state, it is possible to carry out the filling operation of the filling product 11 in which no air is trapped.

The example shown in FIG. 9 is arranged as follows: A flexible tube 55 is provided to a distal end of the filling nozzle 41, and a pressing mechanism 56 adapted to squeeze this flexible tube 55 during the filling operation is provided. When the filling operation is started, the elastic mold 10 is squeezed by this pressing mechanism 56. Subsequently, in this state, the filling of the filling material 11 is carried out while the elastic mold 10 is being gradually expanded with a pressure slightly greater than that of the pressing mechanism 56.

If such an arrangement is adopted, the filling material 11 is filled into the elastic mold 10 which is squeezed and in which practical y air exists it possible to fill the filling material 11 into the elastic mold 10 without air bubbles.

In addition, there is a case where it is desirable to produce the cast product 12 by using two or more kinds of material. In such a case, if, for instance, a plurality of different kinds of material are to be laminated in the height-wise direction of the cast product 12, it is possible to produce such a product by filling the filling material 11 comprising different materials in a plurality of cycles by using the filling unit 40 such as the one described above.

When the cast product 12 is produced by using two or more kinds of material, there is a case where it is desirable to form the cast product 12 into a double structure by dividing the materials into an inside portion an outer peripheral portion of the cast product 12.

Specifically, such cases include those in which whiskey is filled inside chocolate, or ordinary chocolate and white chocolate are formed into a double structure.

In such a case, the filling material is first made to adhere to the inner peripheral surface of the elastic mold 110, and after the filling material 11 adhering to the inner peripheral surface thereof is allowed to solidify to form a hollow cast product 12. Subsequently, a different kind of filling material 11 is further filled in the inside thereof, and the filling material 11 is finally solidified after it is further applied to the filling section 13 on the side of the fixing member 14.

At this juncture, the following three means are available as means for causing the filling material 11 to adhere to the inner peripheral surface of the elastic mold 10.

Figure 10:
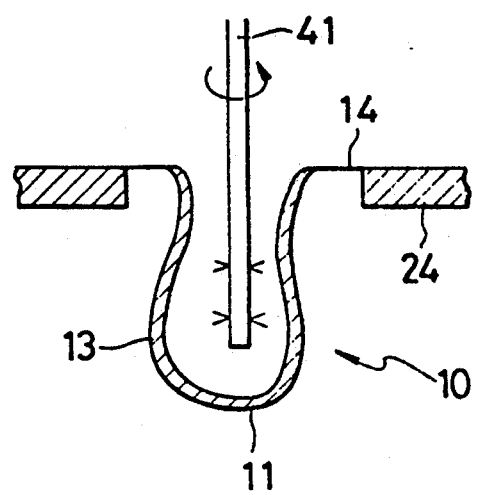

As the first means, as shown in FIG. 10, the filling material 11 is formed in such a manner as to be blown out from the outer peripheral surface of a lower portion of the filling nozzle 41. Subsequently, this filling nozzle is inserted into the filling section 13, and as the filling material 11 is blown out, it is possible to allow the filling material 11 to adhere to the inner peripheral surface of the elastic mold 10. Accordingly, if the filling material 11 is solidified after the above-described adhesion of the filling material is conducted, it is possible to form a hollow cast product 12.

At that juncture, if the filling nozzle 41 is formed rotatably, even if a small number of blow holes required for the filling material 11 is provided in the filling nozzle 41, it is possible to ensure the uniformity of the thickness of adhesion of the filling material 11 onto the inner surface of the elastic mold 10.

If the filling material 11 is solidified after the filling material 11 is thus adhered to the inner surface of the elastic mold 10, it is possible to form a hollow cast product 12.

The second means relates to the present invention and is arranged such that the filling material 11 in an amount which is equivalent to the amount to be filled is temporarily filled inside the elastic mold 10, and the filling material 11 thus filled is solidified by the solidifying unit 60.

Since the solidification of such a filling material begins with the outer peripheral surface of the elastic mold 10, there is a case where the peripheral surface portion of the filling material 11 in the elastic mold 10 is solidified, while a central portion thereof has not yet been solidified.

Figure 11:
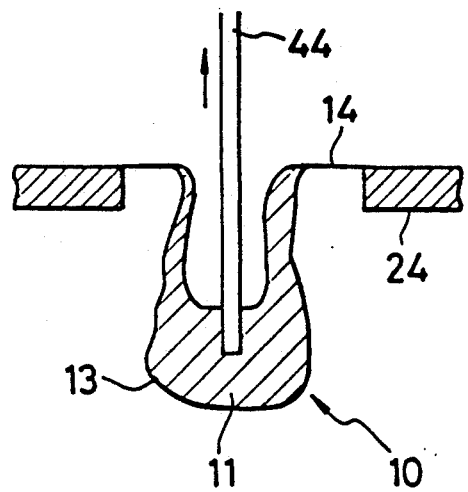

Accordingly, before the entire portion solidifies and when the outer peripheral portion in the filling section 13 has been solidified, as shown in FIG. 11, the unsolidified filling material in the central portion of the filling section 13 is sucked by using a suction nozzle 44 disposed inside the filling section 13, and the filling material 11 on the inner peripheral surface of the elastic mold 10 is allowed to solidify, thereby producing the hollow cast product 12.

If this arrangement is provided, the thickness of the hollow cast product 12 can be set as necessary, depending on the position of the transfer conveyor 20 for sucking the non-solid filling material by using the suction nozzle 44.

Figure 12:
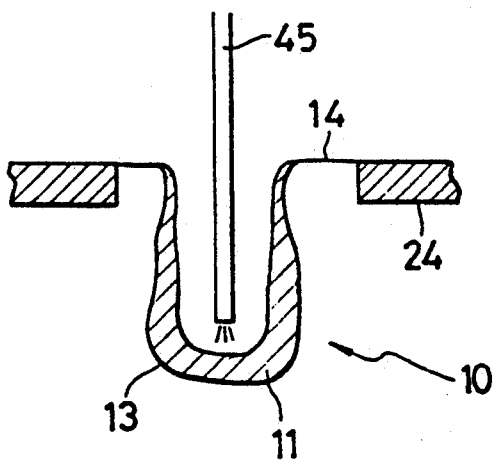

As the third means, the filling material 11 is filled up to about half of the filling section 13, and before this filling material 11 solidifies, air is blown into the filling section 13 by a blowing nozzle 45, as shown in FIG. 12, so as to cause the filling material 11 inside the filling section 13 to be blown upward, thereby allowing the filling material 11 to be brought into close contact with the inner peripheral surface of the filling section 11.

If solidification is effected in such a state, it is possible to produce the hollow cast product 12.

While the filling material 11 is being filled by the above-described filling unit 40, there is a case where the elastic mold 10 is subjected to deformation depending on a filling pressure. Furthermore, there is a case where the elastic mold 10 is subjected to deformation by the weight of the filling material 11 itself before it is allowed to solidify. In such cases, it is possible to prevent deformation by disposing a jig (not shown) below the elastic mold 10 to effect the filling operation, a subsequent transferring operation, or the like.

Figure 13:
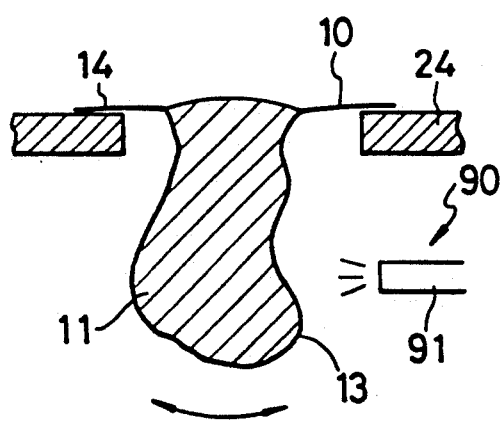
FIG. 13 is a schematic diagram illustrating a leveling unit.

FIG. 13 illustrates a bottom surface-leveling unit 90.

This leveling unit 90 is adapted to oscillate the elastic mold 10 to the left and the right by an air pressure from an air nozzle 91 after the filling material 11 has been filled inside the elastic mold 10.

As the elastic mold 10 is oscillated to the left and the right, the surface of the filling material 11 in the vicinity of the opening of the elastic mo)d 10 is made level.

This process is carried out to improve the stability of the cast product 12 solidified by the solidifying unit 60 and withdrawn by the withdrawal unit 70 when the cast product 12 is displayed for sale in an upright position.

When the air pressure is not used, for instance, it is possible to provide a collision piece for being brought into contact with the elastic mold 10 while the filling unit 40 is being transferred after completion of the filling operation, so that the elastic mold 10 is oscillated to the left and the right as it is brought into contact with this collision piece.

The solidifying unit 60 is used for solidifying the filling material 11 inside the elastic mold 10. This unit comprises a heating mechanism, a cooling mechanism, a combination thereof, or another mechanism.

The specific arrangement of the solidifying unit 60 is determined by the material of the filling material 11.

For instance, when the filling material 11 solidifies by cooling, such as oils and fats, butter, margarine, chocolate, cheese, jelly, ice cream, water, or the like, the solidifying unit 60 is provided as a cooling unit.

On the contrary, if the filling material 11 hardens by heating, such as a protein solution, fish cake, fish or, a rubber eraser, the solidifying unit 60 is provided as a heating unit.

Furthermore, when the filling material 11 is a foodstuff, there is a case where the filling material 11 needs to be solidified and cooked. In such a case, a cooking unit may be used by being attached to the solidifying unit 60.

Furthermore, when the hollow cast product 12 is produced by using the suction nozzle 44 as in the case of the present invention, a necessary amount of filling material 11 is temporarily filled inside the elastic mold 10 before the entire body is solidified by the solidifying unit 60.

Since the filling material 11 inside the elastic mold 10 solidifies due to the temperature of the atmosphere surrounding the elastic mold 10, solidification starts beginning with the inner peripheral surface of the elastic mold 10 which is susceptible to the effect of the ambient temperature.

Accordingly, in terms of the state of the filling material 11 before complete solidification, the portion of the filling material 11 in the vicinity of the inner peripheral surface of the elastic mold 10 is solidified, but the central portion of the filling material 11 remains non-solid.

Therefore, when such a hollow cast product 12 is to be produced, the filling material 11 is allowed to solidify up to a state in which the portion of the filling material 11 in the vicinity of the inner peripheral surface of the elastic mold 10 is solidified, and yet the central portion of the filling material remains non-solid. Subsequently, the non-solid portion of the filling material 11 in the central portion of the elastic mold 10 is sucked by the suction nozzle 44, as described above, and the solidified portion of the filling material 11 in the vicinity of the inner peripheral surface of the elastic mold 10 is left in a hollow form.

Subsequently, if the filling material 11 thus remaining in the vicinity of the inner peripheral surface of the elastic mold 10 is further solidified by the solidifying unit 60, it is possible to obtain the completely solidified hollow cast product 12.

In addition, in the present invention, since the elastic mold 10 is used as the mold, even if the volume of the filling material 11 increases or decreases when the filling material 11 is solidified by the solidifying unit 60, the elastic mold 10 will not break. In the case of the mold formed of a rigid body, if, for instance, water is solidified as the filling material 11, the volume will increase, so that there are cases where the mold breaks by the internal pressure due to an increase in its volume. In the present invention, however, since the elastic mold 10 becomes elongated with an increase in the volume, breakage or the like does not occur.

Figure 14:
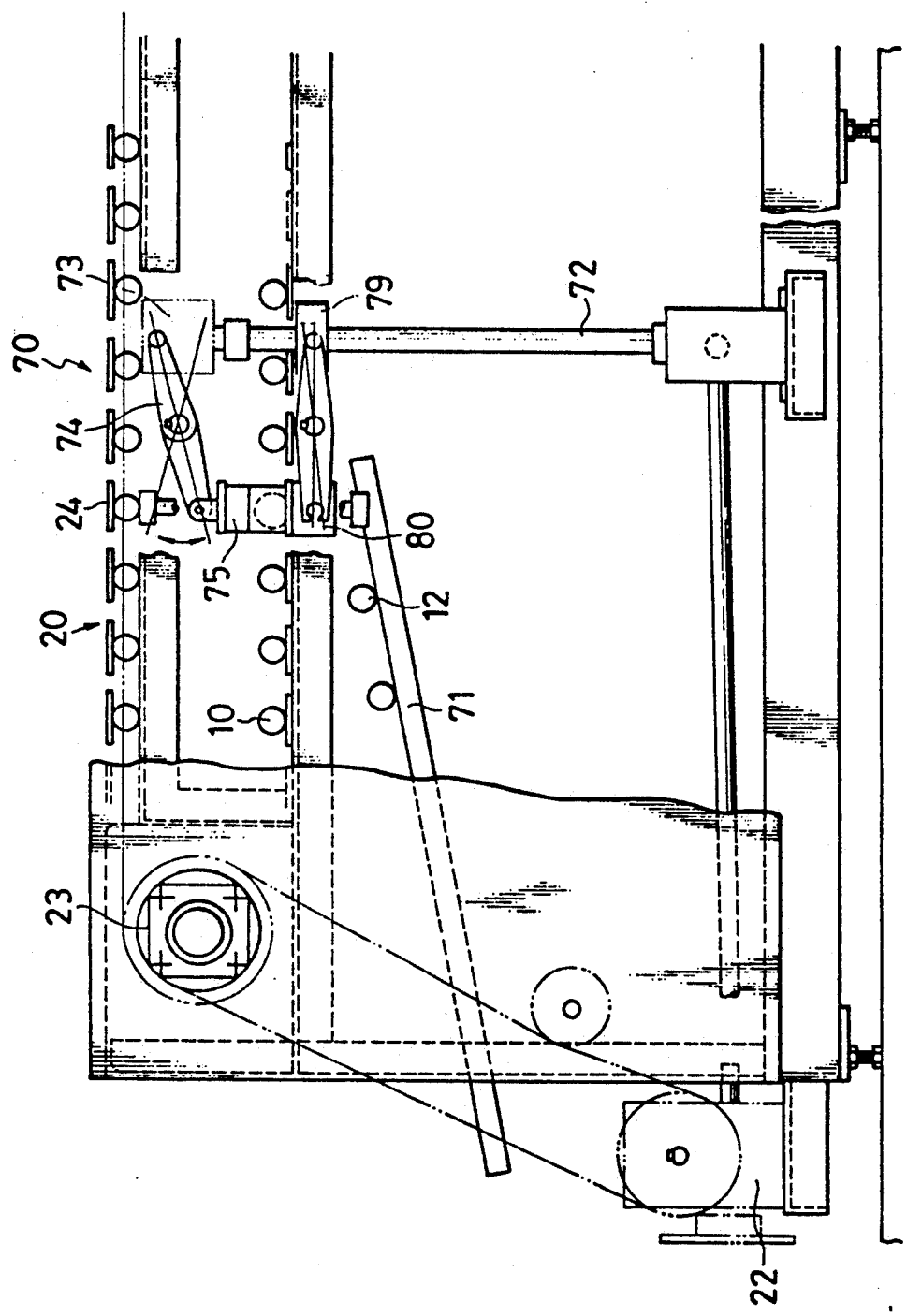
FIG. 14 is a cross-sectional view of a withdrawal unit.
Figure 15:
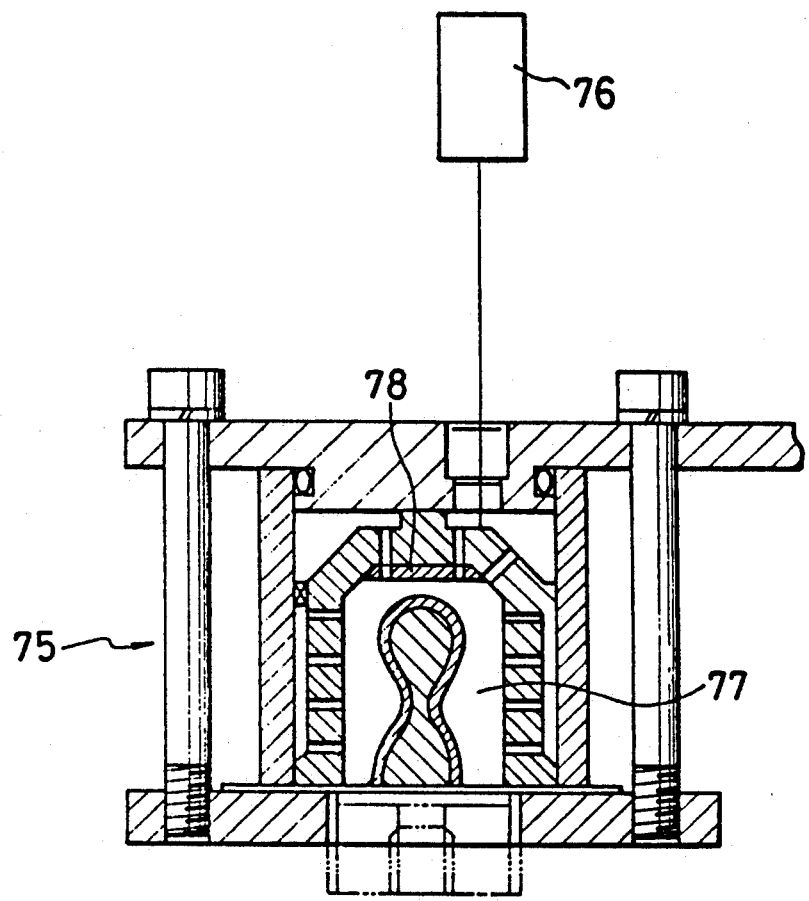
FIG. 15 is a cross-sectional view of a vacuum unit.

FIGS. 14 and 15 illustrate the withdrawal unit 70 for withdrawing the solidified cast product 12 from inside the filling section 13 of the elastic mold 10.

Such a withdrawal unit 70 is capable of extruding the cast product 12 since the elastic mold 10 can expand by virtue of its elasticity if the cast product 12 is pressed from the side of the elastic mold 10 opposite to the opening thereof. In addition, after the opening is expanded in advance by an external force, the cast product 12 can be extruded from the side of the elastic mold 10 opposite to the opening.

When either method is used, there are cases where the side of the cast product opposite to the opening is subjected to deformation. Accordingly, the following withdrawal unit 70 may be used as a specific example of a method of preventing an external force from being applied to only a certain portion of the cast product 12.

Such a withdrawal unit 70 is arranged such that the filling section 13 located below the fixing sheet 24 of the transfer conveyor 20 is inverted by a pulley 23 so as to be located thereabove, and as this filling section 13 is expanded, the inner cast product 12 is allowed to drop onto a withdrawal conveyor 71 located below the withdrawal unit 70. Nevertheless, the withdrawal of the cast product 12 may also be effected when the filling section 13 is in a horizontal state.

Specifically, the withdrawal unit 70 comprises a rotary shaft 72 adapted to rotate by the motor 21, a vacuum cam 73 fixed to this rotary shaft 72, a transmission rod 74 adapted to vibrate by the rotation of the vacuum cam 73, and a vacuum unit 75 pivotally supported at a distal end of this transmission rod 74.

The rotary shaft 72 is adapted to rotate by the same motor 21 as that for moving the transfer conveyor 20, in synchronism with various other units. The vacuum cam 73 is formed as a front cam fixed to the rotary shaft 72. The vacuum unit 75 is connected to a vacuum source 76 and is adapted to keep a vacuum chamber inside the vacuum unit 75 in a vacuum. Although a detailed illustration is omitted, the vacuum source 76 is formed of a vacuum pump, a valve, a pressure gauge, etc. The vacuum chamber 77 has a size sufficient to cover the filling section in which the cast product 12 is contained, and a cushion 78 is fixed on an upper surface of the interior thereof.

This withdrawal unit 70 operates as follows: After the filling material 11 filled inside the filling section 13 is solidified by the solidifying unit 60, the filling section 13 is inverted by the pulley 23 and is moved intermittently by the transfer conveyor 20 in such a manner that the filling section 13 with the cast product 12 solidified therein is placed on the upper side.

At this time, if the upper portion of the filling section 13 is covered with the vacuum chamber 77, and if the vacuum chamber 77 is evacuated by the vacuum source 76, the elastic mold 10 formed of an elastic body expands in such a manner as to be brought into close contact with the inner wall of the vacuum chamber 77. At this time, the filling section 13 of the elastic mold 10 and the fixing member 14 are subjected to deformation so as to contact the inner wall of the vacuum chamber 77 as closely as possible. Therefore, an opening which agrees with a fixing hole 25 of the fixing sheet 24 is formed on the lower side.

In the embodiment, however, since the thickness of the fixing member 14 is made greater than that of the filling section 13, the filling section 13 expands more than the fixing member 14 during expansion, and the fixing member 14 is elongated in such a manner as to be deformed toward the side of the filling section 13 (see FIG. 4). Therefore, the withdrawal of the cast product 12 can be carried out readily.

Subsequently, the cast product 12 is released from the elastic mold 10, and falls downward through the fixing hole 25 of the fixing sheet 24 which is larger than the cast product 12.

The cast product 12 which has fallen down is placed on the withdrawal conveyor 71 positioned below the withdrawal unit 70 and is transferred to a predetermined position.

If a vacuum is thus formed, the filling section 13 is elongated in the direction in which the elastic mold 10 is liable to be elongated, i.e., upwardly as viewed in the illustrated example. Hence, there is a possibility that the filling section 13 may collide against the upper surface of the interior of the vacuum chamber 77 and its configuration may be damaged as a result. In the illustrated example, however, the cushion 78 is fixed to the upper surface of the interior of the vacuum chamber 77 to prevent such deformation.

In the illustrated example, a guide cam 79 is fixed on the rotary shaft 72. This guide cam 79 is used to vertically move a guide unit 80 for withdrawing the cast product 12 which has fallen from the filling section 13 and for guiding the same to the conveyor 71.

Although in the illustrated example, this vacuum chamber 77 is formed into the shape of a cylinder with a cover, a totally or partially tapered chamber (not shown) is preferable because such a shape permits the product 12 to fall freely from the interior of the vacuum chamber 77.

Figure 16:
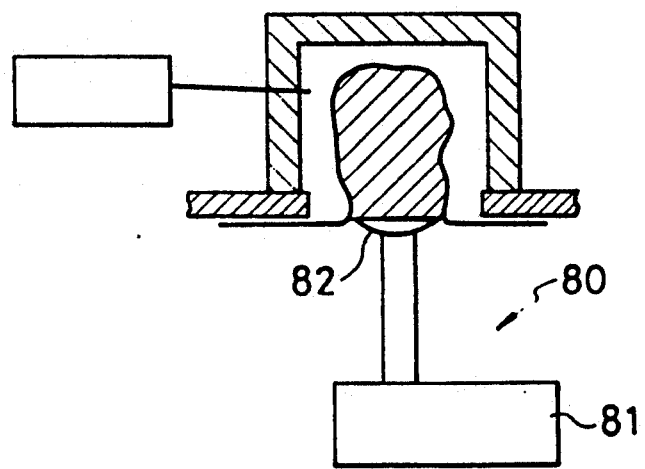
FIG. 16 is a schematic diagram illustrating another example of the withdrawal unit.

However, with respect to the cast product 12 which is not readily released from the mold by using the above-described withdrawal unit 70 because of the complicated configuration of the cast product 12 or due to the adhesion between the cast product 12 and the filling section 13 of the elastic mold 10, it is possible to provide a vertical motion unit 81 and a vacuum sucking unit 82 on the guide unit 80, as shown in FIG. 16, and to cause the cast product 12 to be released forcibly from the elastic mold 10 by means of the vacuum sucking unit 82.

To give a more detailed description, by using the vertical motion unit 81, the vacuum sucking unit 82 of the guide body 80 is brought into proximity with the cast product 12 solidified in the elastic mold 10, and is then made to suck the cast product 12 under a vacuum.

Subsequently, the internal pressure of the vacuum chamber 77 is reduced by the vacuum source 76, and the elastic mold 10 is expanded inside the vacuum chamber 77.

At this juncture, since the cast product 12 remains sucked by the vacuum sucking unit 82, only the elastic mold 10 is expanded in a state in which the cast product 12 sucked by the vacuum sucking unit 82. As a result, the cast product 12 is removed from the elastic mold 10 at the position in which the cast product 12 is sucked by the vacuum sucking unit 82.

Furthermore, when it is still difficult for the cast product 12 to be released by using such a means, the vacuum sucking unit 82 of the guide unit 80 is made to approach the cast product 12 inside the elastic mold 10 by using the vertical motion unit 81 shown in FIG. 16 and is made to suck the cast product 12 under a vacuum. Subsequently, the vacuum sucking unit 82 is made to further move upward by a slight degree.

Then, air enters a space between the cast product 12 and the vicinity of the opening edge of the filling section 13 of the elastic mold 10. Accordingly, if the elastic mold 10 is subsequently expanded inside the vacuum chamber 77, the release of the cast product 12 from the elastic mold 10 is started beginning with the portion where air has entered. Thus it is possible to effect more positively the release of the cast product 12 from the elastic mold 10.

As a result of conducting various experiments, it was verified that, when ice is produced as the cast product 12, if the filling section 13 of the elastic mold 10 and the fixing member 14 are formed of a rigid latex having a thickness of 0.5 to 0.8 mm and 0.8 to 1.1 mm, respectively, and if the vacuum is set to approximately 500 mmHg, the cast product 12 can be released completely and drops in 0.5 to 1 second.

Since the overall configuration of the cast product 12 thus produced is determined by the configuration of the filling section 13 of the elastic mold 10, it is possible to produce the cast products 12 of any configuration by fabricating a variety of elastic molds.

Unlike a rigid mold, the elastic mold 10 can be mass-produced at low costs, so that the cost of the cast product 12 itself can be reduced. In addition, unlike the split mol, no mark of a joint is left, so that the finished cast product 12 assumes a very natural shape and its product value becomes high. Furthermore, since it is unnecessary to split the mold into a plurality of directions, the production process can be simplified.

In addition, since the elastic mold 10 is used as the mold, even if a change takes place in the volume of the filling material 11 during the solidification process using the solidifying unit 60, it is possible to sufficiently cope with such a change by virtue of the expansion and contraction of the elastic mold 10, so that the elastic mold 10 is not susceptible to breakage.

Since the withdrawal unit 70 using a vacuum is employed to effect withdrawal of the cast product 12, the cast product 12 is not susceptible to breakage of its configuration during the withdrawal process.

It should be noted that any material may be used for the elastic mold 10 insofar as it is capable of elongating when stretched, such as soft rubber, soft plastic or the like.

As described in detail herein, since an elastic mold having an open-bag shaped filling section is used as the mold, it is possible to produce cast products with no joint marks left. Furthermore, it is possible to reduce the production cost of the mold itself, prevent the breakage of the mold, and effect substantial simplification of the production process, as well as produce hollow cast products and meet demand for diverse cast products.

We claim:

1. A method of providing cast products, comprising the steps of:
   providing an apparatus which includes a filling unit wherein a non-solid material is filled, said filling unit having elastic molds having open bag shaped interior filling sections, said filling unit further having a filling nozzle insertable internally of the filling sections of the elastic molds, and said filling unit further having a blowing nozzle for blowing air into the filling sections,
   partly filling, through said filling nozzle, said filling sections of said elastic molds with said non-solid material, blowing air, through said blowing nozzle, into said partly filled filling sections before said material solidifies to blow said material upward and cause said material to contact the inner peripheral surface of said filling sections thereby leaving an interior hollow space within said material, solidifying the material caused to contact the inner peripheral surface in said elastic molds to form cast products, and elastically expanding said elastic molds to a size greater than that of the cast products so as to allow the cast products to be withdrawn.

2. The method of claim 1, wherein said filling sections are generally cup shaped with an open upper filling and withdrawing end, said filling sections each constituting a single expandable member.

* * * * *